United States Patent
Lei et al.

(10) Patent No.: US 10,897,623 B2
(45) Date of Patent: Jan. 19, 2021

(54) VIDEO CODING DEVICE AND VIDEO CODING METHOD

(71) Applicant: FUJITSU LIMITED, Kawasaki (JP)

(72) Inventors: Xuying Lei, Kawasaki (JP); Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/544,983

(22) Filed: Aug. 20, 2019

(65) Prior Publication Data

US 2020/0077103 A1    Mar. 5, 2020

(30) Foreign Application Priority Data

Sep. 5, 2018  (JP) ................. 2018-166289

(51) Int. Cl.
*H04N 19/179*  (2014.01)
*H04N 19/91*   (2014.01)
*H04N 19/577*  (2014.01)
*H04N 19/70*   (2014.01)

(52) U.S. Cl.
CPC ........ *H04N 19/179* (2014.11); *H04N 19/577* (2014.11); *H04N 19/70* (2014.11); *H04N 19/91* (2014.11)

(58) Field of Classification Search
USPC .................................................. 375/240.02
See application file for complete search history.

(56) References Cited

U.S. PATENT DOCUMENTS

| | | | | |
|---|---|---|---|---|
| 7,881,366 | B2* | 2/2011 | Kubota ................ | H04N 5/147 375/240 |
| 2005/0013365 | A1* | 1/2005 | Mukerjee ............ | H04N 19/587 375/240.16 |
| 2012/0307881 | A1* | 12/2012 | Sawada ............... | H04N 19/115 375/240.01 |
| 2014/0092966 | A1* | 4/2014 | Kazui .................. | H04N 19/44 375/240.12 |
| 2017/0272755 | A1* | 9/2017 | Holcomb ............. | H04N 19/146 |

FOREIGN PATENT DOCUMENTS

| | | |
|---|---|---|
| JP | 06-165159 | 6/1994 |
| JP | 10-229563 | 8/1998 |
| JP | 2011-239255 | 11/2011 |

\* cited by examiner

*Primary Examiner* — Behrooz M Senfi
(74) *Attorney, Agent, or Firm* — Fujitsu Patent Center

(57) ABSTRACT

A video coding device includes a memory and a processor coupled to the memory. The processor is configured to sequentially receive a plurality of pictures and detect a scene change based on the plurality of pictures. When a scene change is detected, the processor determines whether a given condition is satisfied by a position of a first picture where the scene change is detected. When the given condition is satisfied by the position of the first picture, the processor redisplays, instead of the first picture, a forward second picture among a plurality of pictures referenced by the first picture.

12 Claims, 13 Drawing Sheets

F I G . 1
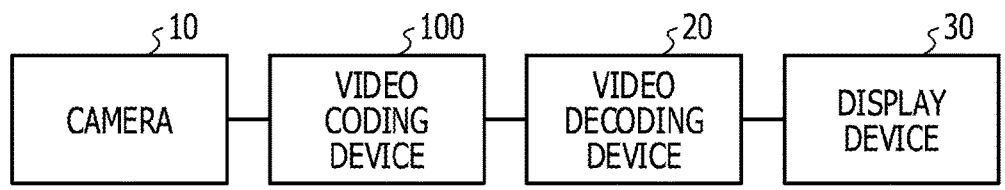
F I G . 2
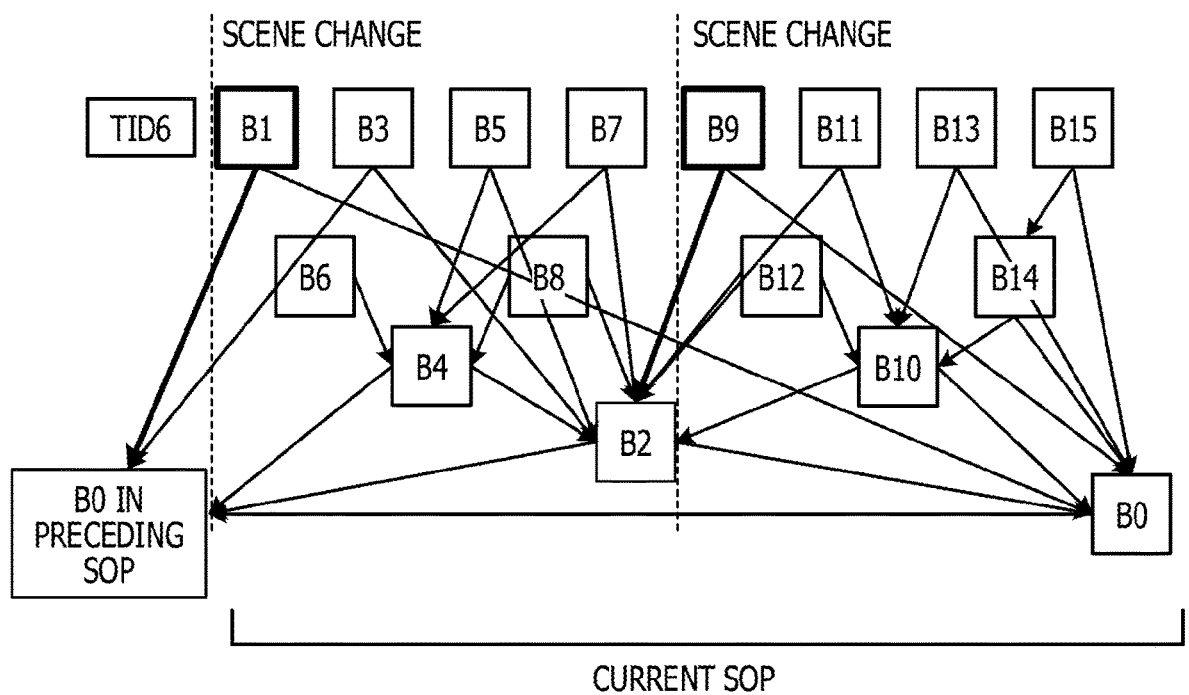

| PICTURE NUMBER | FORWARD REFERENCE DISTANCE | BACKWARD REFERENCE DISTANCE |
|---|---|---|
| B1 | 1 | 15 |
| B3 | 3 | 5 |
| B5 | 1 | 3 |
| B7 | 3 | 1 |
| B9 | 1 | 7 |
| B11 | 3 | 1 |
| B13 | 1 | 3 |
| B15 | 1 | 1 |

110a

VIDEO CODING DEVICE AND VIDEO CODING METHOD

CROSS-REFERENCE TO RELATED APPLICATION

This application is based upon and claims the benefit of priority of the prior Japanese Patent Application No. 2018-166289, filed on Sep. 5, 2018, the entire contents of which are incorporated herein by reference.

FIELD

The embodiments discussed herein are related to a video coding device and a video coding method.

BACKGROUND

High efficiency video coding (HEVC) is a video coding standard, and related to a hierarchical reference structure for easily achieving temporal scalable coding. For example, the association of radio industries and business (ARIB) standard (STD-B32) defines 120 Hz/60 Hz scalable coding based on HEVC. The 120 Hz/60 Hz scalable coding is temporal scalable coding for easily acquiring only 60 Hz components in a case where 120 Hz video is to be coded.

In the ARIB standard (STD-B32), the decoding sequence of and the reference relationship between pictures having a temporal identification (TID) of 6 are changed so that the same presentation time stamp (PTS) and decoding time stamp (DTS) are used for both 120 Hz reproduction and 60 Hz reproduction. The TID indicates the hierarchical level of a picture. The greater a TID number, the deeper the hierarchical level.

FIG. 15 is a diagram illustrating an exemplary structure of picture (SOP) related to temporal scalable coding. The SOP indicates each picture (intra-coded (I) picture, predictive-coded (P) picture, and bidirectional predictive-coded (B) picture) targeted for coding by using its TID and display sequence. In FIG. 15, the vertical axis represents the TID, and the horizontal axis represents the display sequence. An upper limit is imposed on the amount of information assigned to one SOP. The n-th B picture to be coded (decoded) is designated as Bn.

B1, B3, B5, B7, B9, B11, B13, and B15 pictures have a TID of "6." B6, B8, B12, and B14 pictures have a TID of "3." B4 and B10 pictures have a TID of "2." A B2 picture has a TID of "1." I and I/P/B0 pictures have a TID of "0." The sequence in which the pictures are decoded and displayed is I, B1, B6, B3, B4, B5, B8, B7, B2, B9, B12, B11, B10, B13, B14, B15, and I/P/B0.

Each arrow in FIG. 15 indicates a reference picture that is to be referenced when a picture is to be coded. The reference pictures for B1 are I and I/P/B0. The reference pictures for B6 is I and B4. The reference pictures for B3 are I and B2. The reference pictures for B4 are I and B2. The reference pictures for B5 are B4 and B2. The reference pictures for B8 are B4 and B2. The reference pictures for B7 are B4 and B2. The reference pictures for B9 are B2 and I/P/B0. The reference pictures for B12 are B2 and B10. The reference pictures for B11 are B2 and B10. The reference pictures for B10 are B2 and I/P/B0. The reference pictures for B13 are B10 and B14. The reference pictures for B14 are B10 and I/P/B0. The reference pictures for B15 are B14 and I/P/B0.

Each reference picture is at a shallower hierarchical level than a reference source picture. One of the characteristics of hierarchization in the time direction is that the distance between the reference source picture and the reference picture decreases with an increase in the depth of the hierarchical level. When the distance between the reference source picture and the reference picture decreases, the difference between them decreases to provide increased coding efficiency and reduce the amount of information used for coding. In a case where there are a plurality of reference pictures, up to two reference pictures may be used for picture coding. For example, a P picture is a frame that is capable of expressing only a difference if it does not reference the preceding "I frame." A B picture is a frame that is capable of expressing only a difference if it does not reference the preceding or succeeding "I frame," "P frame," and "B frame." Here, the distance between a first picture and a second picture indicates the difference between the display sequence of the first picture and the display sequence of the second picture.

FIG. 16 is a diagram illustrating characteristics of a picture having a TID. In FIG. 16, the pictures having a TID of 6 are B1, B3, B5, B7, B9, B11, B13, and B15. The pictures having a TID of 6 are at the deepest hierarchical level and not referenced by the other pictures. Therefore, they are referred to as the "unreferenced pictures." As each picture having a TID of 6 is close to a reference picture, the amount of information used for coding is small. The total amount of information assigned to the pictures having a TID of 6 is 10% to 20% of the amount of information assigned to one whole SOP. The amount of information assigned per picture is 1% to 2% of the amount of information assigned to one whole SOP.

In a case where two reference pictures are referenced, the distance between a coding target picture and a reference picture existing forward of the coding target picture is defined as the "forward reference distance." The distance between the coding target picture and a reference picture existing backward of the coding target picture is defined as the "backward reference distance." The coding target picture may not necessarily reference two reference pictures. The coding target picture may reference only one reference picture existing either forward or backward.

In the example of FIG. 16, the forward reference distance of B1 is "1," and its backward reference distance is "15." The forward reference distance of B3 is "3," and its backward reference distance is "5." The forward reference distance of B5 is "1," and its backward reference distance is "3." The forward reference distance of B7 is "3," and its backward reference distance is "1." The forward reference distance of B9 is "1," and its backward reference distance is "7." The forward reference distance of B11 is "3," and its backward reference distance is "1." The forward reference distance of B13 is "1," and its backward reference distance is "3." The forward reference distance of B15 is "1," and its backward reference distance is "1."

The backward reference distance may become longer depending on the picture display sequence. For example, the backward reference distance of B1 is "15." The backward reference distance of B9 is "7."

Examples of the related-art documents include Japanese Laid-open Patent Publication Nos. 10-229563, 06-165159, and 2011-239255.

SUMMARY

According to an aspect of the embodiment, a video coding device includes: a memory; and a processor coupled to the memory and the processor configured to, sequentially receives a plurality of pictures and detects a scene change based on the plurality of pictures, when the scene change is detected, determines whether or not a given condition is satisfied by a position of a first picture where the scene change is detected, and when the given condition is satisfied by the position of the first picture, redisplays, instead of the first picture, a forward second picture among a plurality of pictures referenced by the first picture.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration of a system according to a first embodiment;

FIG. 2 is a diagram (1) illustrating a process performed by a video coding device according to the first embodiment;

DESCRIPTION OF EMBODIMENTS

For example, the above-mentioned related art has a problem that causes image quality degradation when a scene change occurs in a picture having a TID of 6.

When a scene change occurs in a picture having a TID of 6, it is difficult to reference a forward reference picture. Further, the distance to a backward reference picture becomes longer so as to increase the difference between the picture and the backward reference picture. This decreases coding efficiency. Furthermore, the decrease in the coding efficiency degrades overall image quality.

Figure 17:
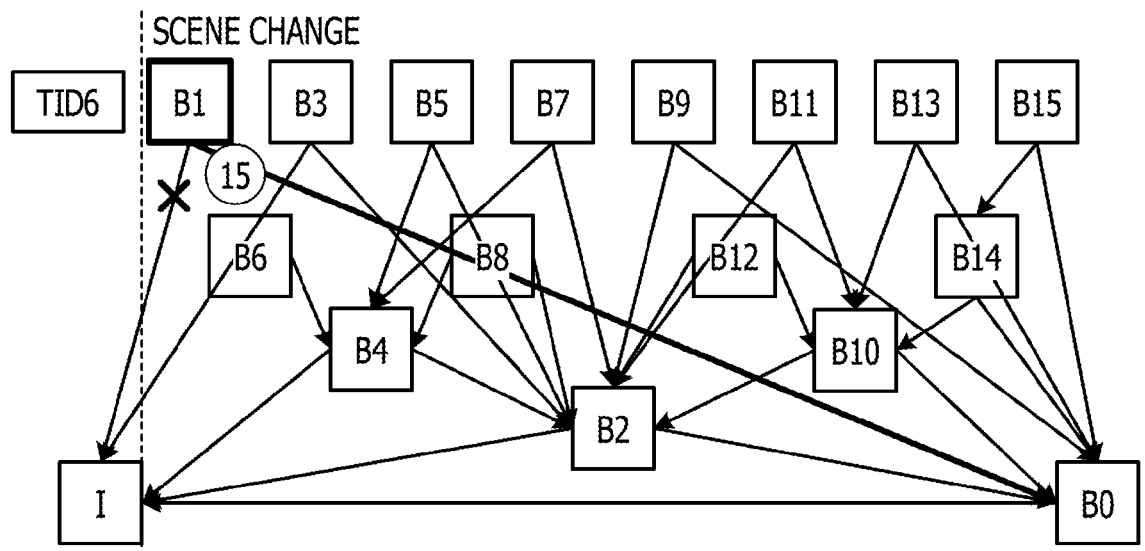
FIG. 17 is a diagram (1) illustrating a related-art problem.

FIG. 17 is a diagram (1) illustrating a related-art problem. For example, in a case where a scene change occurs beginning with B1, I and B1 significantly differ from each other. Therefore, when B1 is to be coded, B0 is referenced. If B0 is referenced when B1 is to be coded, the difference between B1 and B0 becomes significant due to a long distance. This decreases the coding efficiency and causes image quality degradation.

A situation where the difference between B1 and B0 is significant may be handled by assigning an increased amount of information to B1. However, the amount of information assignable to one SOP is limited. Therefore, increasing the amount of information assigned to B1 decreases the amount of information assignable to the other pictures. This lowers the peak signal-to-noise ratio (PSNR) of the other pictures.

Figure 18:
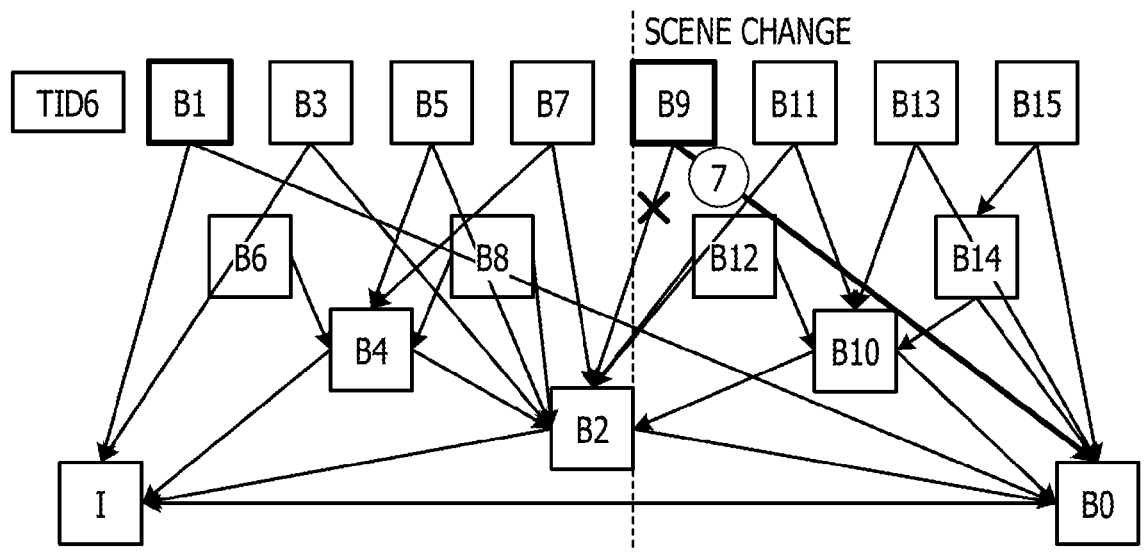
FIG. 18 is a diagram (2) illustrating a related-art problem.

FIG. 18 is a diagram (2) illustrating a related-art problem. For example, in a case where a scene change occurs beginning with B9, B2 and B9 significantly differ from each other. Therefore, when B9 is to be coded, B0 is referenced. If B0 is referenced when B9 is to be coded, the difference between B9 and B0 becomes significant due to a long distance. This decreases the coding efficiency and causes image quality degradation.

A situation where the difference between B0 and B9 is significant may be handled by assigning an increased amount of information to B9. However, the amount of information assignable to one SOP is limited. Therefore, increasing the amount of information assigned to B9 decreases the amount of information assignable to the other pictures. A decrease in the amount of information regarding a reference picture lowers the overall PSNR of the pictures.

Embodiments of a video coding device, a video coding method, and a video coding program disclosed by the present application will now be described in detail with reference to the accompanying drawings. It is to be understood that the present disclosure is not limited by the embodiments described below.

First Embodiment

FIG. 1 is a diagram illustrating a configuration of a system according to a first embodiment. As illustrated in FIG. 1, the system includes a camera 10, a video coding device 100, a video decoding device 20, and a display device 30. The camera 10 and the video coding device 100 are intercoupled. The video coding device 100 and the video decoding device 20 are intercoupled through internet protocol (IP) network transmission by using, for example, an optical line. The video decoding device 20 and the display device 30 are intercoupled.

The camera 10 is used to capture video. The camera 10 transmits information regarding the captured video to the video coding device 100. It is assumed that the video information includes a plurality of pictures at each time point.

The video coding device 100 generates stream information by entropy-coding the video information received from the camera 10. The video coding device 100 transmits the stream information to the video decoding device 20.

The video decoding device 20 generates video by receiving the stream information from the video coding device 100 and decoding the received stream information. The video decoding device 20 outputs information regarding the video to the display device 30.

The display device 30 receives the information regarding video from the video decoding device 20 and displays the video. The display device 30 corresponds, for example, a liquid-crystal display, a touch panel, or a television monitor.

Figure 3:
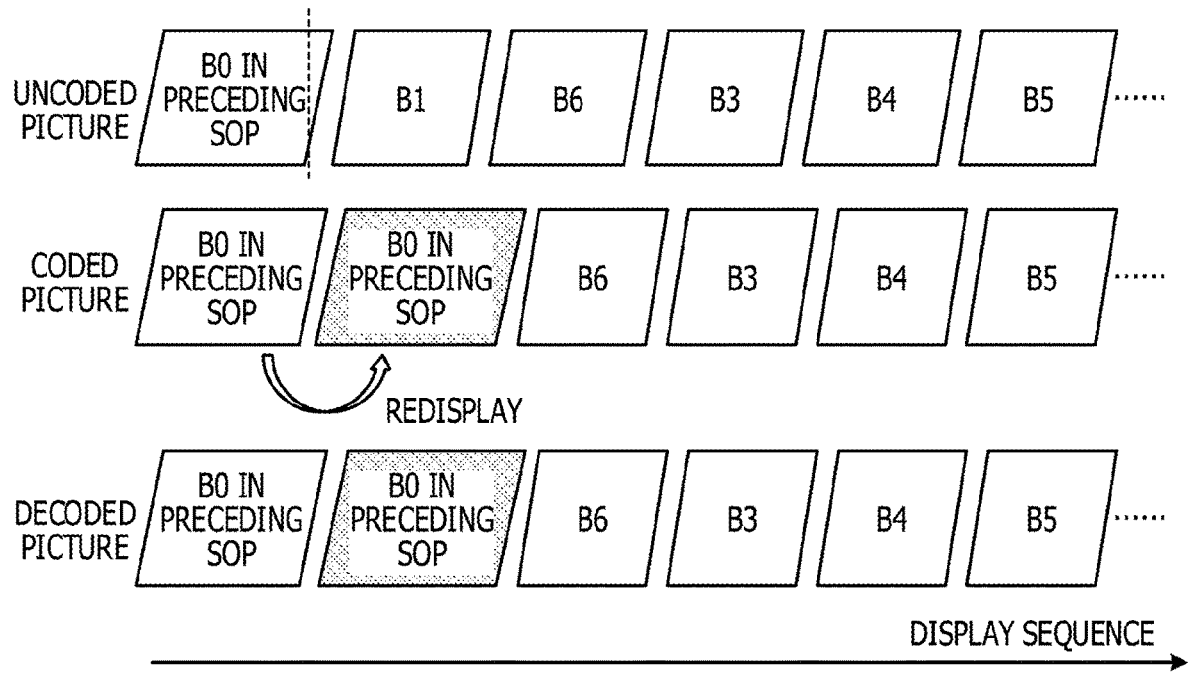
FIG. 3 is a diagram (2) illustrating a process performed by a video coding device according to the first embodiment.

An example of a process performed by the video coding device 100 according to the first embodiment will now be described. FIGS. 2 and 3 illustrate a process performed by a video coding device according to the first embodiment. When a scene change occurs in a picture in a case where temporal scalable coding is to be performed, the video coding device 100 determines whether or not the scene-changed picture is at a special position. If the scene-changed picture is at the special position, the video coding device 100 reduces the amount of information generated due to the scene change by redisplaying a reference picture existing forward of the scene-changed picture.

If a backward reference distance of the scene-changed picture is equal to or longer than a threshold value Th1 and a forward reference distance is 1, the video coding device 100 determines that the scene-changed picture is at the special position. In the following description, a condition in which the backward reference distance of a scene-changed picture is equal to or longer than the threshold value Th1 and the forward reference distance is 1 is referred to as the "special position condition." Further, the threshold value Th1 used in conjunction with the special position condition is defined by Equation (1). In Equation (1), PicNumInSOP represents the number of pictures in one SOP.

$$Th1 = PicNumInSOP/3 \quad (1)$$

Referring to FIG. 2, a case where a scene change occurs in "B1" in the current SOP will be described. It is assumed that the forward reference picture for B1 is B0 in the preceding SOP. It is also assumed that the forward reference distance of B1 in the current SOP is "1," and that the backward reference distance is "15." FIG. 2 indicates that the number of pictures in one SOP is "16." Therefore, the threshold value Th for the special position condition is approximately "5.3" so that B1 is a picture satisfying the special position condition.

As the scene change has occurred in B1 so that B1 satisfies the special position condition, the video coding device 100 redisplays B0 in the preceding SOP, which acts as the forward reference picture for B1. As illustrated in FIG. 3, uncoded pictures are sequentially inputted to the video coding device 100 in the sequence of B0 (B0 in the preceding SOP), B1, B6, B3, B4, B5, and so on. After coding B0 (B0 in the preceding SOP), the video coding device 100 performs a redisplay process so as to enable a B1 decoded picture to redisplay B0 (B0 in the preceding SOP) with respect to B1. Subsequently, the video coding device 100 performs coding in the sequence of B6, B3, B4, B5, and so on. The video decoding device 20 receives the coded pictures from the video coding device 100, and decodes the received coded pictures in the sequence of B0 (B0 in the preceding SOP), B1, B6, B3, B4, B5, and so on. B1 has redisplayed B0 (B0 in the preceding SOP). Therefore, as illustrated in FIG. 3, the decoded pictures are B0 (B0 in the preceding SOP), B0 (B0 in the preceding SOP), B6, B3, B4, B5, and so on. The display device 30 displays decoded video.

In a case where no scene change has occurred or the special position condition is not satisfied by B1, the video coding device 100 generates coded pictures by sequentially coding B0 (B0 in the preceding SOP), B1, B6, B3, B4, B5, and so on in a normal manner without performing the redisplay process.

Returning to FIG. 2, a case where a scene change occurs in "B9" of the current SOP will be described. It is assumed that the forward reference picture for B9 is B2. It is also assumed that the forward reference distance of B1 is "1," and that the backward reference distance is "7." As the threshold value Th for the special position condition is approximately "5.3," B9 is a picture satisfying the special position condition. As the scene change has occurred in B9 so that B9 satisfies the special position condition, the video coding device 100 redisplays B2, which acts as the forward reference picture for B9.

Figure 4:
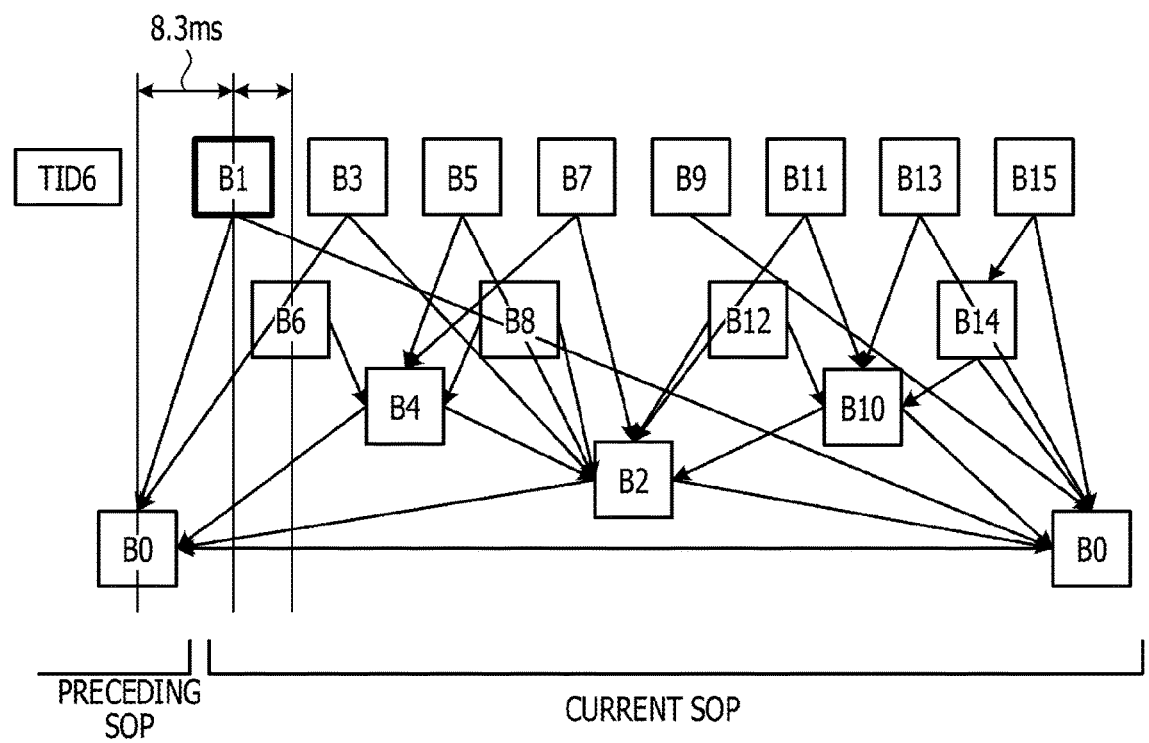
FIG. 4 is a diagram illustrating a reason why a forward reference picture is used as a replacement.

A reason why the forward reference picture is used as a replacement will now be described. FIG. 4 is a diagram illustrating a reason why a forward reference picture is used as a replacement. FIG. 4 depicts an example in which B1 is replaced by B0 (B0 in the preceding SOP). First of all, a picture having a TID of 6 is an unreferenced picture. Therefore, even if such a picture is replaced, such a replacement does not affect the other pictures. Further, 8K 120p video is such that the display interval between the pictures is "8.3 ms." B0 is a picture immediately preceding B1, and the display time interval between them is short. Therefore, the replacement of B1 by B0 is not easily recognized by a user. Meanwhile, if B1 is not replaced by B0 (B0 in the preceding SOP), a picture positioned at a distance (B0 in the current SOP) is coded as a reference picture. This decreases the coding efficiency and causes image quality degradation. When B1 having degraded image quality is displayed subsequently to clear B0 (B0 in the preceding SOP), such image quality degradation is conspicuous and easily recognized.

Figure 5:
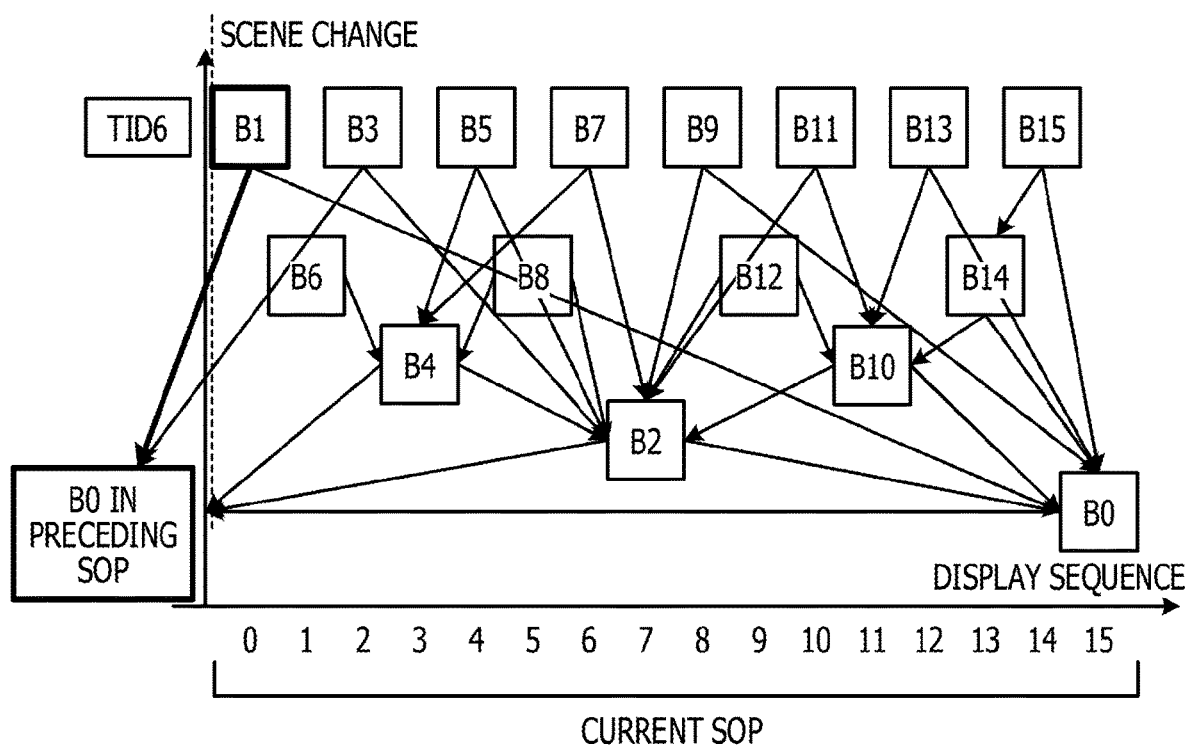
FIG. 5 is a diagram illustrating a reason why a backward reference picture is not referenced and coded.

A reason why the backward reference picture is not redisplayed will now be described. FIG. 5 is a diagram illustrating a reason why a backward reference picture is not redisplayed. Normally, the display sequence is "B0 in the preceding SOP, B1, B6, B3, B4, B5, . . . , B15, B0 in the current SOP." When the backward reference picture is redisplayed, the display sequence is "B0 in the preceding SOP, B0 in the current SOP, B6, B3, B4, B5, . . . , B15." As described above, when the backward reference picture is redisplayed, a picture listed later in a display sequence is displayed earlier than a picture listed earlier in the display sequence. This gives an uncomfortable feeling to the user viewing decoded video.

Figure 6:
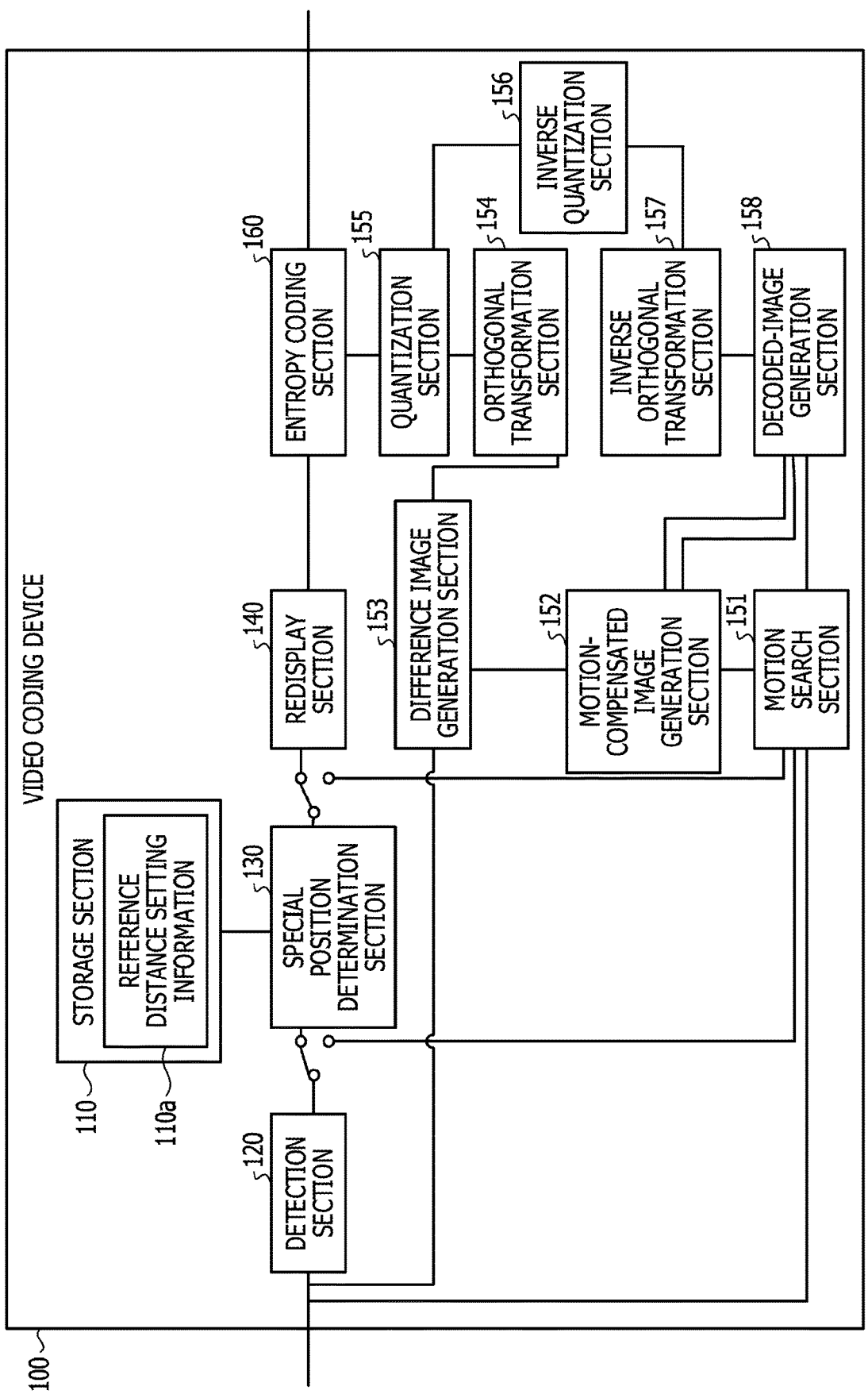
FIG. 6 is a functional block diagram illustrating a configuration of a video coding device according to the first embodiment.

An exemplary configuration of the video coding device depicted in FIG. 1 will now be described. FIG. 6 is a functional block diagram illustrating a configuration of a video coding device according to the first embodiment. As illustrated in FIG. 6, the video coding device 100 includes a storage section 110, a detection section 120, a special position determination section 130, a redisplay section 140, a motion search section 151, a motion-compensated image generation section 152, and a difference image generation section 153. Additionally, the video coding device 100 includes an orthogonal transformation section 154, a quantization section 155, an inverse quantization section 156, an inverse orthogonal transformation section 157, a decoded-image generation section 158, and an entropy coding section 160. The special position determination section 130 is an example of a determination section. The redisplay section 140 and the entropy coding section 160 are examples of a redisplay processing section.

It is assumed that, upon receipt of video information (a plurality of time-series pictures) from the camera, the video coding device 100 assigns a picture number of each picture on an individual SOP basis. It is also assumed that, in order from the first to the last, the picture numbers assigned to the pictures are B1, B6, B3, B4, B5, B8, B7, B2, B9, B12, B11, B10, B13, B14, B15, and B0.

The storage section 110 includes a reference distance setting information 110a. The storage section 110 corresponds to a semiconductor memory element, such as a random-access memory (RAM), a read-only memory (ROM), or a flash memory, and a storage device such as a hard disk drive (HDD).

Figures 7, 8:
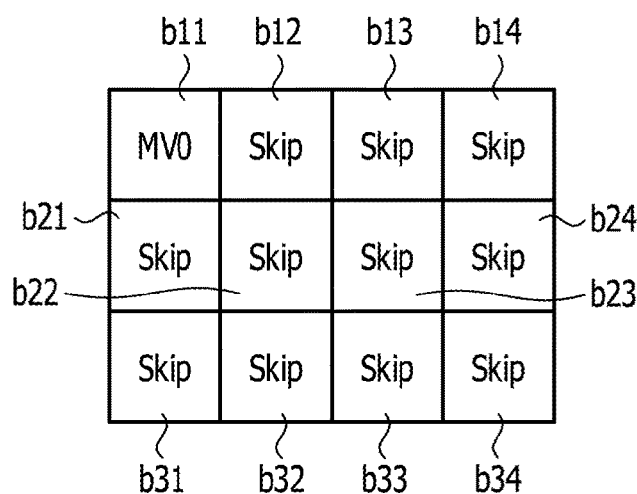
FIG. 7 is a diagram illustrating an exemplary data structure of reference distance setting information according to the first embodiment.
FIG. 8 is a diagram illustrating an exemplary data structure of a coded picture in a case where repetition is made.

The reference distance setting information 110a defines the forward reference distance and backward reference distance of an unreferenced picture. FIG. 7 is a diagram illustrating an exemplary data structure of reference distance setting information according to the first embodiment. As illustrated in FIG. 7, the reference distance setting information 110a associates the picture numbers with the forward reference distance and the backward reference distance. The picture numbers uniquely identify the unreferenced pictures (pictures having a TID of 6). The forward reference distance denotes the distance between a specific picture and a reference picture existing forward of the specific picture. The backward reference distance denotes the distance between a specific picture and a reference picture existing backward of the specific picture.

The detection section 120 is a processing section that sequentially receives video information (a plurality of pictures) from the camera 10, and detects a scene change based on the plurality of pictures. Upon detecting a scene change, the detection section 120 outputs a scene change detection signal to the special position determination section 130. When no scene change is detected, the detection section 120 outputs a scene change non-detection signal to the motion search section 151.

An example of a scene change detection process performed by the detection section 120 will now be described. The detection section 120 calculates the absolute value of difference in luminance at the same position between the current picture and the preceding picture. The detection section 120 calculates a first image correlation value by performing a process of calculating the absolute value at each position within one picture and cumulatively adding the calculated absolute values.

Each time the current picture is superseded by the next picture, the detection section 120 calculates the first image correlation value between the current picture and the preceding picture. The detection section 120 calculates the difference in the first image correlation value calculated at each time point, and uses the calculated difference as a second image correlation value. When the second image correlation value is equal to or greater than a threshold value Th2, the detection section 120 detects a scene change. Upon detecting a scene change, the detection section 120 includes the picture number of a scene-changed picture in the scene change detection signal and outputs the resulting scene change detection signal to the special position determination section 130.

For example, referring to FIG. 2, the difference between the first image correlation value calculated from B7 and B2 and the first image correlation value calculated from B2 and B9 is regarded as the second image correlation value. When the second image correlation value is equal to or greater than the threshold value Th2, the detection section 120 detects a scene change. Further, the detection section 120 determines that the scene-changed picture is "B9." The detection section 120 may detect a scene change by using the technology described in Japanese Laid-open Patent Publication No. 2000-324499.

The special position determination section 130 is a processing section that determines whether or not the special position condition is satisfied by a scene-changed picture. Based on a picture number included in a detection signal received from the detection section 120 and on the reference distance setting information 110a, the special position determination section 130 determines whether or not the special position condition is satisfied by a picture having the picture number included in the detection signal. If the special position condition is satisfied by the picture having the picture number included in the detection signal, the special position determination section 130 outputs control information to the redisplay section 140. If the special position condition is not satisfied by the picture having the picture number included in the detection signal, the special position determination section 130 outputs control information to the motion search section 151.

Based on Equation (1), the special position determination section 130 calculates the threshold value Th1 beforehand. It is assumed that the value of PicNumInSOP in Equation (1) is preset. If the special position condition is satisfied, the special position determination section 130 includes the picture number satisfying the special position condition in control information and outputs the control information to the redisplay section 140.

A case where, for example, the special position determination section 130 has received a detection signal including the picture number "B1" from the detection section 120 will now be described. Upon comparing the picture number "B1" with the reference distance setting information, the special position determination section 130 finds that the forward reference distance of a picture numbered "B1" is "1," and that the backward reference distance is "15." Therefore, the special position determination section 130 determines that the special position condition is satisfied by the picture having the picture number "B1." The special position determination section 130 includes the picture number "B1" in control information and outputs the control information to the redisplay section 140.

The redisplay section 140 is a processing section that redisplays a picture listed one position earlier in the display sequence than a picture having a picture number included in the control information in a case where the control information is received from the special position determination section 130. For example, as described with reference to FIG. 3, in a case where the control information includes the picture number "B1," the redisplay section 140 redisplays "B0 in the preceding SOP."

An example of a process performed by the redisplay section 140 to redisplay the immediately preceding picture will now be described. The redisplay section 140 performs the redisplay process and outputs a redisplay result to the entropy coding section 160. The "redisplay process" is performed on a coding target picture to set a forward reference picture as the reference picture, set the motion vector of every block to zero, and set the transformation coefficient of every block to zero.

FIG. 8 is a diagram illustrating an exemplary data structure of a coded picture in a case where repetition is made. As illustrated in FIG. 8, the coded picture includes coded blocks b11 to b34. The coded block b11 stores information regarding the motion vector and transformation coefficient. When redisplaying "B0 in the preceding SOP," the redisplay section 140 sets a zero vector as all the motion vectors to be set for the coded block b11, and sets all the transformation coefficients to zero. Further, the redisplay section 140 sets the remaining coded blocks b12 to b34 to a skip mode.

The HEVC standard provides a mode named the skip mode. The skip mode does not transfer the motion vectors and transformation coefficients, and uses a minimum amount of code to achieve coding of coding target blocks. The skip mode selects suitable motion vector information from the vector information regarding neighboring blocks, and transmits only an index identifying the selected motion vector information. In the skip mode, all the transformation coefficients are zero.

When a decoding process is completed with all the motion vectors set to a zero vector and with all the transformation coefficients set to zero, the decoded picture of B1 is the same as the decoded picture of the reference picture "B0 in the preceding SOP." When viewed from the decoded picture, the picture at the B1 position is a redisplayed picture derived from the forward reference picture "B0 in the preceding SOP." Further, it is possible to suppress the amount of information used for coding of B1 by setting all the motion vectors to a zero vector and setting all the transformation coefficients to zero. This makes it possible to avoid a decrease in the overall PSNR because a significant amount of information is not removed from the other pictures.

The motion search section 151 sequentially receives video information (a plurality of pictures) from the camera 10, and sequentially receives decoded pictures from the decoded-image generation section 158. The motion search section 151 compares the current picture with preceding and succeeding pictures in order to search for the motion of an object included in the pictures. The motion search section 151 outputs retrieved motion information to the motion-compensated image generation section 152.

For example, while receiving a non-detection signal from the detection section 120 and receiving control information from the special position determination section 130, the motion search section 151 performs the above-described process on each picture acquired from the camera 10.

The motion-compensated image generation section 152 is a processing section that generates a motion-compensated image based on the motion information received from the motion search section 151 and on the pictures received from the decoded-image generation section 158. The motion-compensated image generation section 152 outputs the motion-compensated image to the difference image generation section 153 and the decoded-image generation section 158. The motion-compensated image is, for example, a picture that is obtained by returning an object having moved between the reference picture and the current picture to the position of the reference picture. Ideally, the motion-compensated image is identical to the reference picture.

The difference image generation section 153 is a processing section that generates a difference image between the motion-compensated image and an original image of each picture acquired from the camera 10. The difference image generation section 153 outputs the difference image to the orthogonal transformation section 154.

The orthogonal transformation section 154 is a processing section that calculates an orthogonal coefficient by subjecting the difference image to orthogonal transformation. The orthogonal transformation section 154 outputs information regarding the orthogonal coefficient to the quantization section 155.

The quantization section 155 is a processing section that receives the information regarding the orthogonal coefficient from the orthogonal transformation section 154 and quantizes the orthogonal coefficient. The quantized orthogonal coefficient is used as the transformation coefficient. The quantization section 155 outputs information regarding the transformation coefficient to the inverse quantization section 156 and the entropy coding section 160.

The inverse quantization section 156 is a processing section that generates an orthogonal coefficient by performing inverse quantization on the transformation coefficient received from the quantization section 155. The inverse quantization section 156 outputs information regarding the orthogonal coefficient to the inverse orthogonal transformation section 157.

The inverse orthogonal transformation section 157 is a processing section that generates a picture (a picture equivalent to a difference image generated by the difference image generation section 153) by performing inverse orthogonal transformation on the orthogonal coefficient received from the inverse quantization section 156. The inverse orthogonal transformation section 157 outputs the generated picture to the decoded-image generation section 158.

The decoded-image generation section 158 is a processing section that decodes a preceding picture for use in the motion search section 151 based on the picture acquired from the inverse orthogonal transformation section 157 and on the motion-compensated image generated by the motion-compensated image generation section 152. For example, the picture acquired from the inverse orthogonal transformation section 157 is a difference image between the current picture and the preceding picture. Therefore, the decoded-image generation section 158 decodes the preceding picture based on the current picture and on the difference image.

The entropy coding section 160 is a processing section that generates a coded picture by entropy-coding the transformation coefficient acquired from the quantization section 155. The entropy coding section 160 generates stream information by multiplexing coded pictures. The entropy coding section 160 transmits the stream information to the video decoding device 20.

The video decoding device 20 receives the stream information from the video coding device 100, and decodes a picture based on each coded picture included in the stream information. When decoding a coded picture for which the information depicted in FIG. 8 is set, the video decoding device 20 redisplays a given reference picture.

Figure 9:
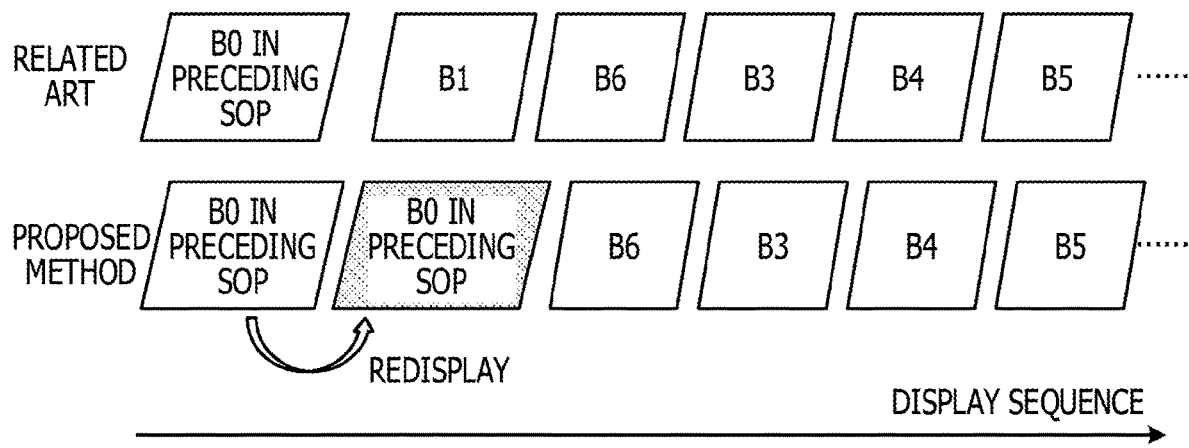
FIG. 9 is a diagram illustrating a result of decoding of each coded picture.

FIG. 9 is a diagram illustrating a result of decoding of each coded picture. As illustrated in FIG. 9, in a case where no repetition is made during the use, for example, of related art, the coded pictures are decoded in the sequence of B0 (B0 in the preceding SOP), B1, B6, B3, B4, B5, and so on. Meanwhile, in a case where a coded picture succeeding the coded picture B0 (B0 in the preceding SOP) is a coded picture depicted in FIG. 8, the decoded B0 is generated again (redisplayed) after decoding of the coded picture B0 (B0 in the preceding SOP). For example, the pictures are decoded in the sequence of B0 (B0 in the preceding SOP), B0 (B0 in the preceding SOP), B6, B3, B4, B5, and so on.

Figure 10:
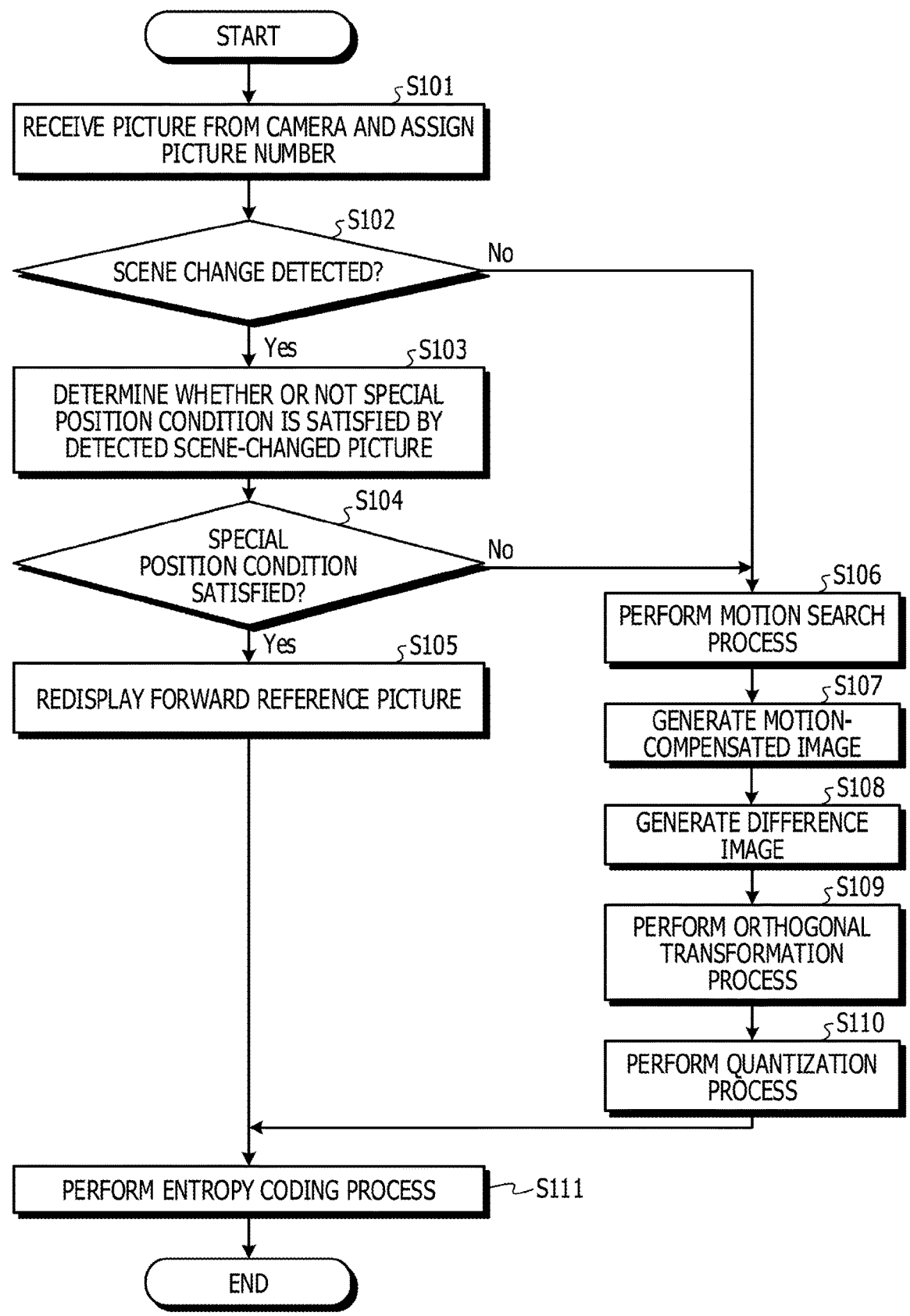
FIG. 10 is a flowchart illustrating processing steps performed by a video coding device according to the first embodiment.

Exemplary processing steps performed by the video coding device 100 according to the first embodiment will now be described. FIG. 10 is a flowchart illustrating processing steps performed by a video coding device according to the first embodiment with reference to FIGS. 1 and 6. As illustrated in FIG. 10, the video coding device 100 receives a picture from the camera 10 and assigns a picture number to the picture (step S101). If a scene change is detected by the detection section 120 ("YES" at step S102), processing proceeds to step S103. Meanwhile, if no scene change is detected by the detection section 120 ("NO" at step S102), processing proceeds to step S106.

The special position determination section 130 of the video coding device 100 determines whether or not the special position condition is satisfied by a detected scene-changed picture (step S103). If the special position determination section 130 determines that the special position condition is satisfied ("YES" at step S104), processing proceeds to step S105. Meanwhile, if the special position condition is not satisfied ("NO" at step S104), processing proceeds to step S106.

The redisplay section 140 of the video coding device 100 performs a process of redisplaying the forward reference picture, and outputs the result of the process to the entropy coding section 160 (step S105).

The motion search section 151 of the video coding device 100 performs a motion search process (step S106). The motion-compensated image generation section 152 of the video coding device 100 generates a motion-compensated image (step S107). The difference image generation section 153 of the video coding device 100 generates a difference image (step S108).

The orthogonal transformation section 154 of the video coding device 100 performs an orthogonal transformation process on the difference image (step S109). The quantization section 155 of the video coding device 100 performs a quantization process on an orthogonal coefficient obtained from the orthogonal transformation process (step S110).

The entropy coding section 160 of the video coding device 100 performs an entropy coding process (step S111).

Advantages of the video coding device 100 according to the first embodiment will now be described. The video coding device 100 detects a scene change. When the special position condition is satisfied by the position of a scene-changed picture, the video coding device 100 performs a process of redisplaying the forward reference picture for the picture satisfying the special position condition. Consequently, even if a scene change occurs in a picture having a TID of 6, it is possible to reduce image quality degradation while restricting the amount of information regarding a scene-changed picture. As a result, significant overall image quality degradation may be avoided.

For example, as described with reference to FIG. 3, the video coding device 100 performs a process of redisplaying B0 (B0 in the preceding SOP) with respect to B1 after coding of B0 (B0 in the preceding SOP). Subsequently, the video coding device 100 performs coding in the sequence of B6, B3, B4, B5, and so on. The video decoding device 20 receives the coded pictures from the video coding device 100 and performs the decoding process. As for a picture in the B1 position, B0 in the preceding SOP is redisplayed. Therefore, the decoded pictures are in the sequence of B0 (B0 in the preceding SOP), B0 (B0 in the preceding SOP), B6, B3, B4, B5, and so on. Decoded video is displayed by the display device 30.

As a picture having a TID of 6 is an unreferenced picture, the other pictures remain unaffected even when a picture having a TID of 6 is replaced. Further, 8K 120p video is such that the display interval between the pictures is "8.3 ms." B0 is a picture immediately preceding B1, and the display time interval between them is short. Therefore, the replacement of B1 by B0 is not easily recognized by the user. Meanwhile, if B1 is not replaced by B0 (B0 in the preceding SOP), a picture positioned at a distance (B0 in the current SOP) is coded as a reference picture. This decreases the coding efficiency and causes image quality degradation. When B1 having degraded image quality is displayed subsequently to clear B0 (B0 in the preceding SOP), such image quality degradation is conspicuous and easily recognized.

Second Embodiment

Figure 11:
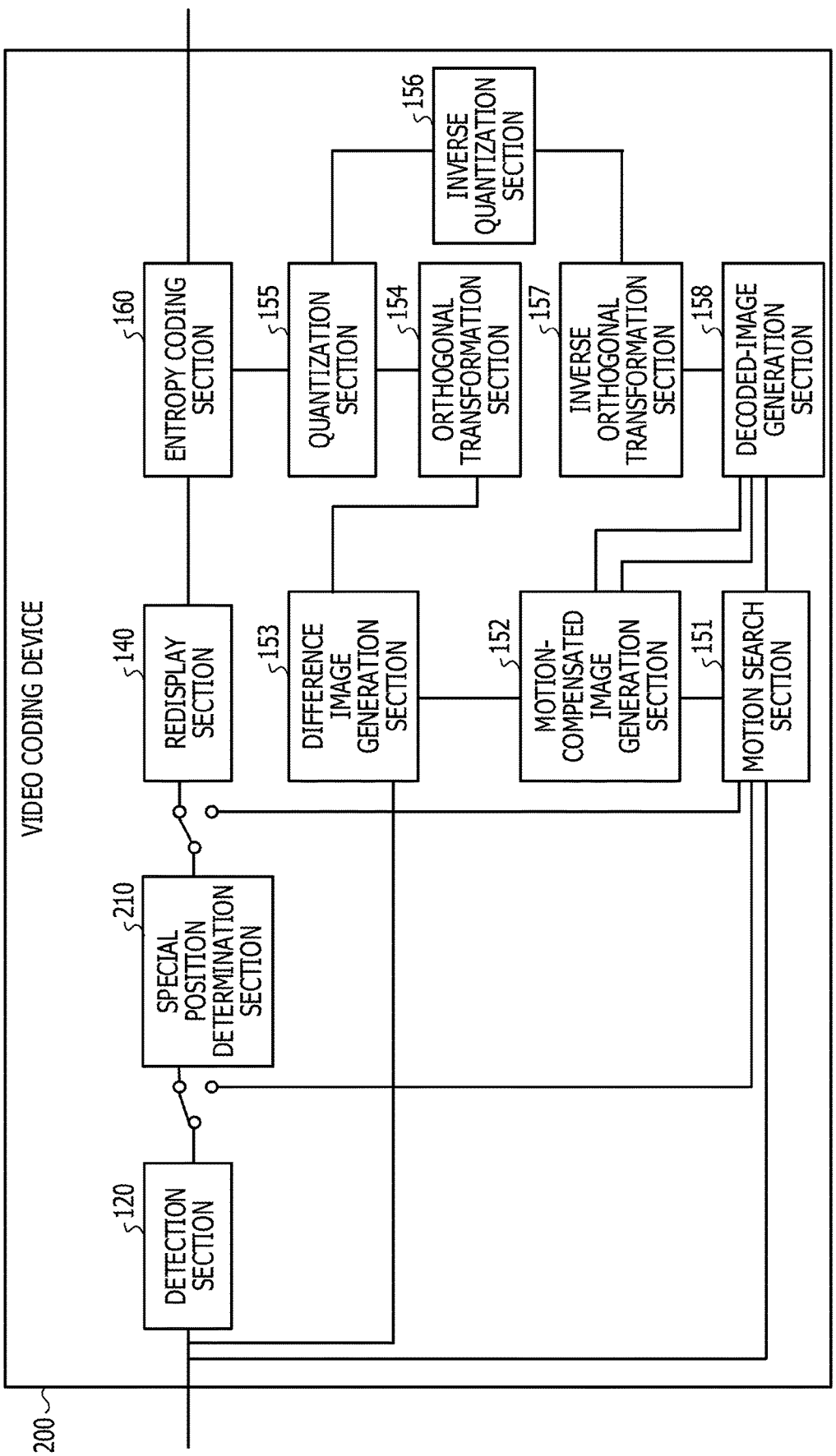
FIG. 11 is a functional block diagram illustrating a configuration of a video coding device according to a second embodiment.

FIG. 11 is a functional block diagram illustrating a configuration of a video coding device according to a second embodiment with reference to FIG. 1. A video coding device 200 according to the second embodiment is coupled to the camera 10 and the video decoding device 20, as is the case with the video coding device 100 described in conjunction with the first embodiment. As illustrated in FIG. 11, the video coding device 200 includes a detection section 120, a special position determination section 210, a redisplay section 140, a motion search section 151, a motion-compensated image generation section 152, and a difference image generation section 153. Additionally, the video coding device 200 includes an orthogonal transformation section 154, a quantization section 155, an inverse quantization section 156, an inverse orthogonal transformation section 157, a decoded-image generation section 158, and an entropy coding section 160. The special position determination section 210 is an example of the determination section. The redisplay section 140 is an example of the redisplay processing section.

The video coding device 200 according to the second embodiment differs from the video coding device 100 according to the first embodiment in the processing performed by the special position determination section 210. Processes performed by the other processing sections of the video coding device 200 are similar to those performed by the processing sections of the video coding device 100. Therefore, such processes are designated by the same reference numerals as the corresponding processes and will not be redundantly described.

If, in a case where a detection signal is received from the detection section 120, a given number of pictures are included in one SOP and a given picture number is included in the detection signal, the special position determination section 210 determines that the special position condition is satisfied by a picture having the picture number. For example, in a case where the number of pictures included in one SOP is "16" and the picture number included in the detection signal is "B1" or "B9," the special position determination section 210 determines that the special position condition is satisfied by the picture having the picture number.

A picture having the picture number "B1" is the first picture from the beginning of one SOP. A picture having the picture number "B9" is the ninth picture from the beginning of one SOP.

Upon receipt of a detection signal including the picture number "B1" from the detection section 120, the special position determination section 210 includes the picture number "B1" in control information and outputs the control information to the redisplay section 140. Further, upon receipt of a detection signal including the picture number "B9" from the detection section 120, the special position determination section 210 includes the picture number "B9" in the control information and outputs the control information to the redisplay section 140.

If the picture number included in the detection signal is neither "B1" nor "B9," the special position determination section 210 outputs the control information to the motion search section 151.

When the special position determination section 210 outputs the control information including the picture number "B1" to the redisplay section 140, the forward reference picture for B1 is redisplayed. Further, when the special position determination section 210 outputs the control information including the picture number "B9" to the redisplay section 140, the forward reference picture for B9 is redisplayed.

Figure 12:
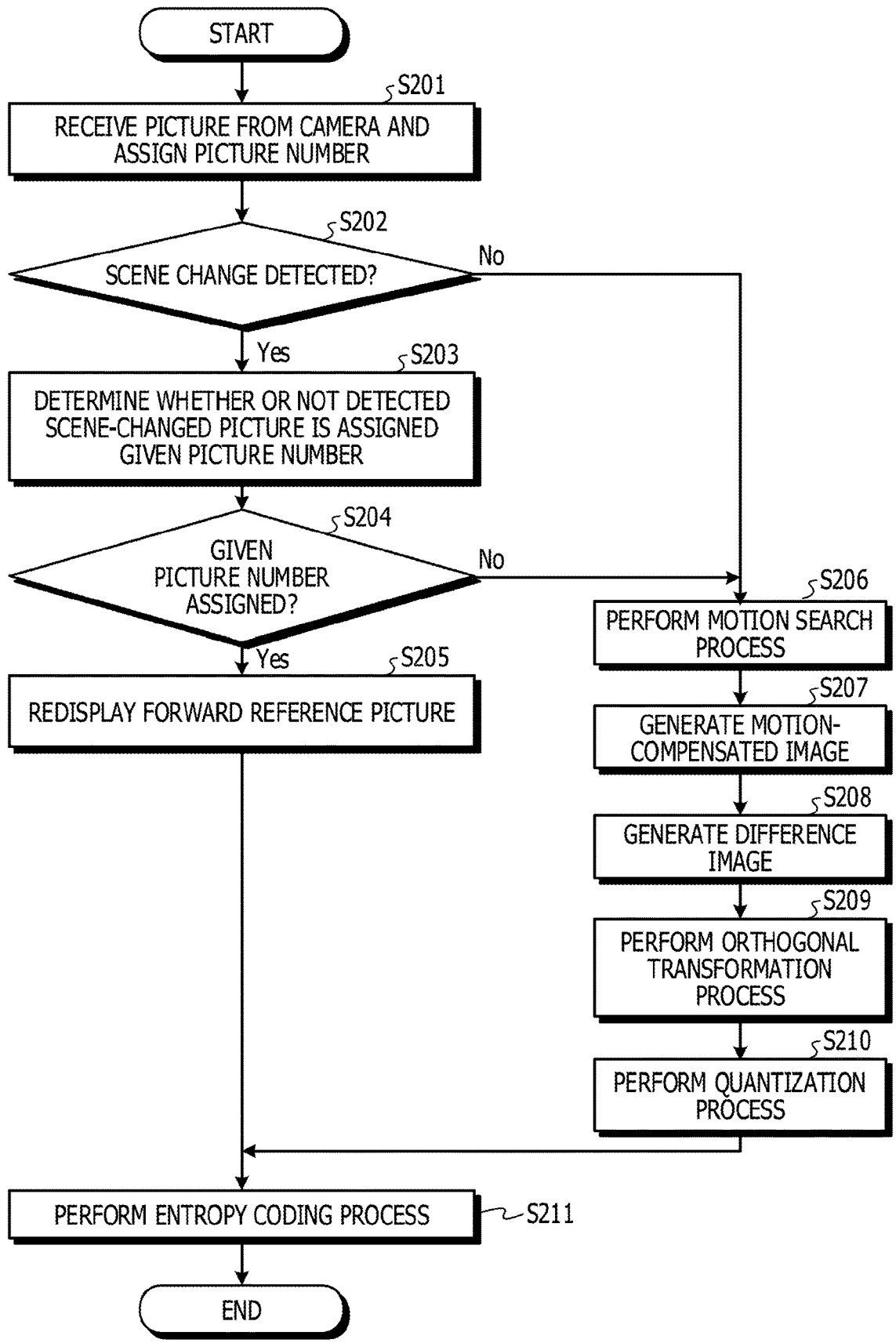
FIG. 12 is a flowchart illustrating processing steps performed by a video coding device according to the second embodiment.

Exemplary processing steps performed by the video coding device 200 according to the second embodiment will now be described. FIG. 12 is a flowchart illustrating processing steps performed by a video coding device according to the second embodiment. As illustrated in FIG. 12, the video coding device 200 receives a picture from the camera 10 and assigns a picture number to the picture (step S201). If a scene change is detected by the detection section 120 of the video coding device 200 ("YES" at step S202), processing proceeds to step S203. If no scene change is detected by the detection section 120 ("NO" at step S202), processing proceeds to step S206.

The special position determination section 210 of the video coding device 200 determines whether or not a given picture number (B1 or B9) is assigned to a detected scene-changed picture (step S203). If the special position determination section 210 determines that the given picture number is assigned ("YES" at step S204), processing proceeds to step S205. If the special position determination section 210 determines that the given picture number is not assigned ("NO" at step S204), processing proceeds to step S206.

The redisplay section 140 of the video coding device 200 redisplays the forward reference picture, and outputs the result of repetition to the entropy coding section 160 (step S205).

The motion search section 151 of the video coding device 200 performs a motion search process (step S206). The motion-compensated image generation section 152 of the video coding device 200 generates a motion-compensated image (step S207). The difference image generation section 153 of the video coding device 200 generates a difference image (step S208).

The orthogonal transformation section 154 of the video coding device 200 performs an orthogonal transformation process on the difference image (step S209). The quantization section 155 of the video coding device 200 performs a quantization process on an orthogonal coefficient obtained from the orthogonal transformation process (step S210).

The entropy coding section 160 of the video coding device 200 performs an entropy coding process (step S211).

Advantages of the video coding device 200 according to the second embodiment will now be described. The video coding device 200 detects a scene change. When the given picture number is assigned to a scene-changed picture, the video coding device 200 performs a process of redisplaying the forward reference picture for the scene-changed picture. Consequently, even if a scene change occurs in a picture having a TID of 6, it is possible to reduce image quality degradation while restricting the amount of information regarding a scene-changed picture. As a result, significant overall image degradation may be avoided.

Incidentally, when redisplaying a reference picture, the above-described video coding devices 100 and 200 generate a coded picture described with reference to FIG. 8. However, the present disclosure is not limited to such a scheme. An alternative is to redisplay an uncoded picture (original image).

Figure 13:
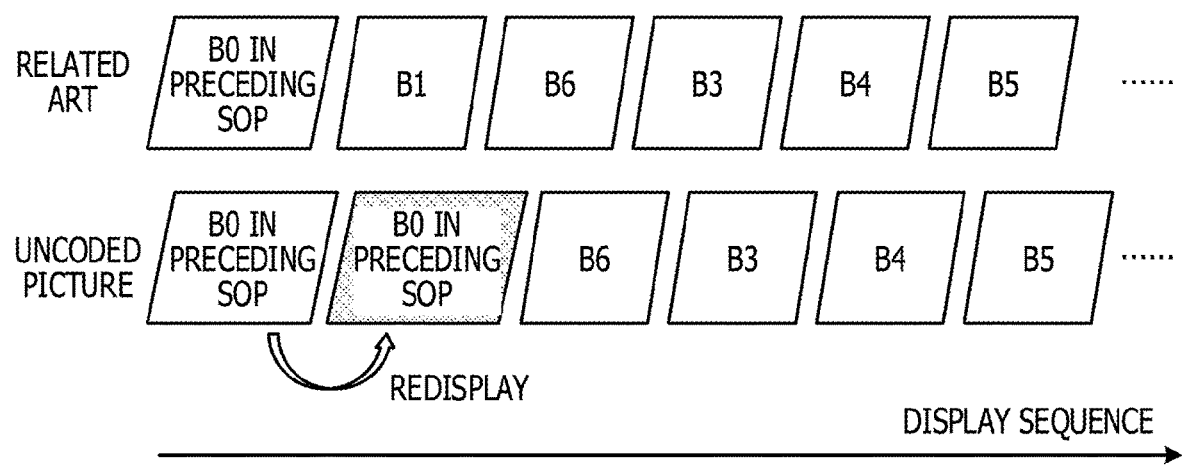
FIG. 13 is a diagram illustrating other processes performed by a video coding device.

FIG. 13 is a diagram illustrating other processes performed by a video coding device. The related art receives pictures in the sequence of B0 in the preceding SOP, B1, B6, B3, B4, B5, and so on, and this sequence remains unchanged even when a scene change occurs in B1. When a scene change is detected in B1 and the special position condition is satisfied by B1, the video coding device 100 (200) copies B0 (original image) in the preceding SOP, and redisplays the uncoded original picture by inserting the copied B0 in place of B1. This ensures that the picture in the B1 position is identical with the reference picture B0 (preceding SOP) even when a scene change occurs in the B1 picture having a TID of 6. Consequently, the difference data becomes all 0 (zero) so as to increase the coding efficiency. As a result, significant image degradation may be avoided.

Figure 14:
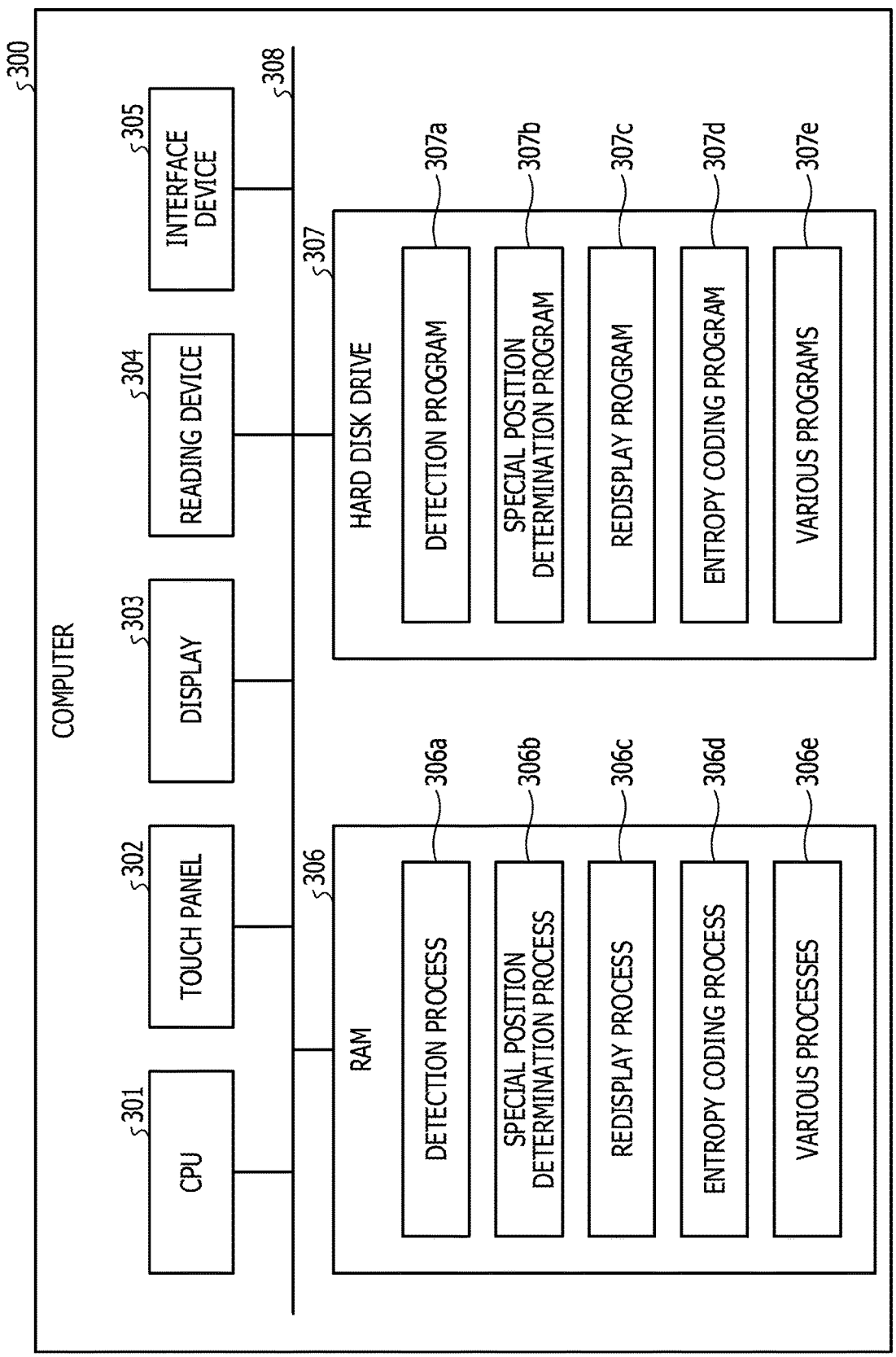
FIG. 14 is a diagram illustrating an exemplary hardware configuration of a computer implementing functions similar to that of video coding devices according to the first or second embodiment.
Figure 15:
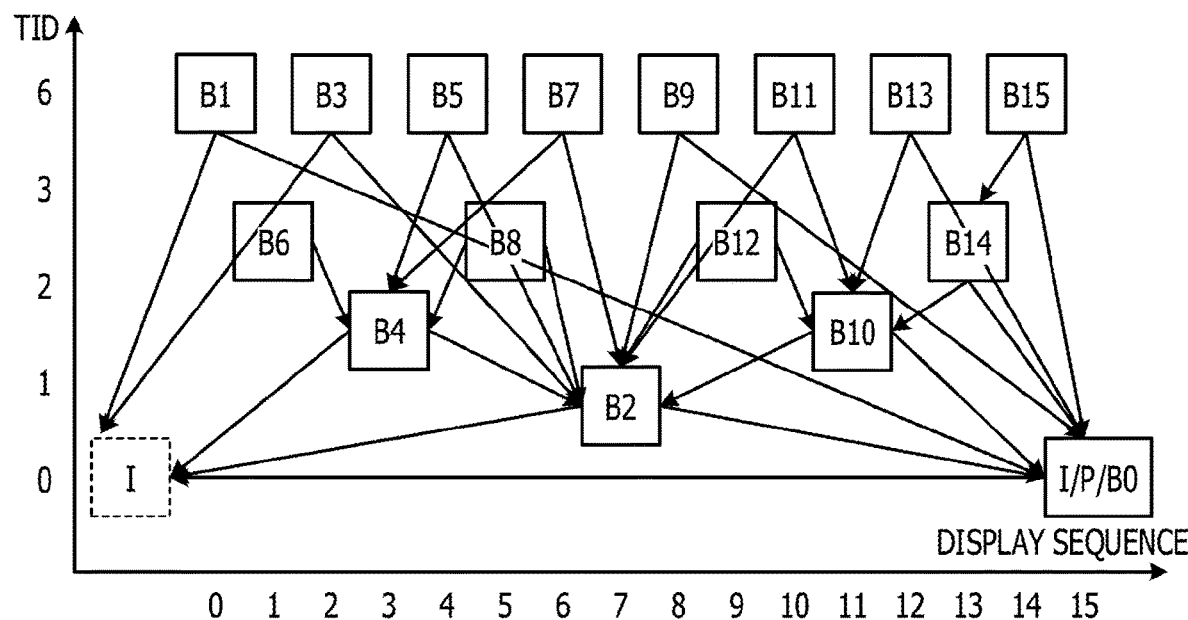
FIG. 15 is a diagram illustrating an exemplary SOP related to temporal scalable coding.
Figure 16:
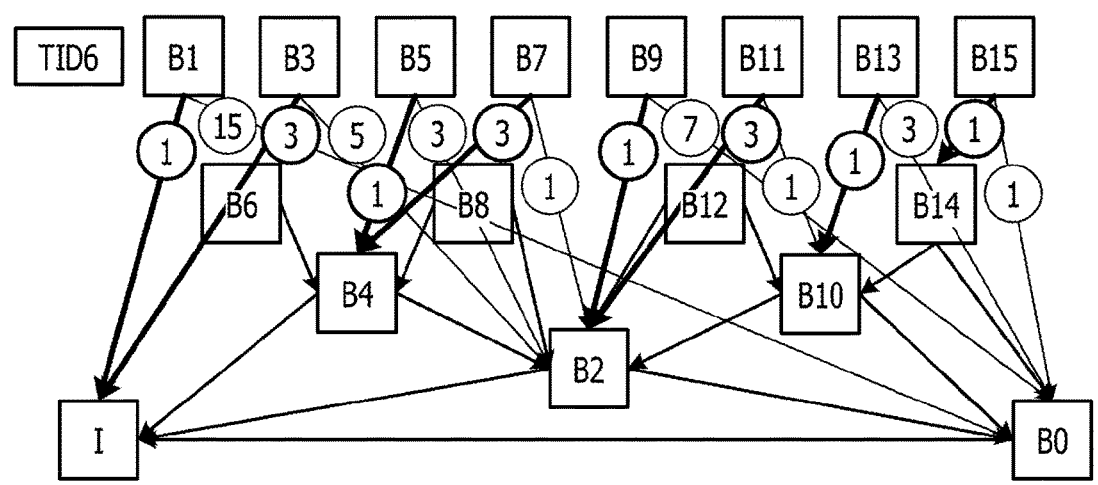
FIG. 16 is a diagram illustrating characteristics of a picture having a TID.

An exemplary hardware configuration of a computer implementing functions similar to that of the video coding devices 100 and 200 according to the above-described first or second embodiment will now be described. FIG. 14 is a diagram illustrating an exemplary hardware configuration of a computer implementing functions similar to that of video coding devices according to the first or second embodiment.

As illustrated in FIG. 14, a computer 300 includes a central processing unit (CPU) 301, an input device 302, and a display 303. The CPU 301 performs various arithmetic processes. The input device 302 receives data input from the user. The CPU 301 may be a single CPU, a multi CPU, or a multi-core CPU. The CPU 301 may be called a processor. Further, the computer 300 includes a reading device 304 and an interface device 305. The reading device 304 reads, for example, a program from a storage medium. The interface device 305 transfers data, for example, between the camera 10 and the video decoding device 20 through a wired or wireless network. The computer 300 additionally includes a RAM 306 and a hard disk drive 307. The RAM 306 temporarily stores various information. The above-mentioned devices 301 to 307 are coupled to a bus 308.

The hard disk drive 307 includes a detection program 307a, a special position determination program 307b, a redisplay program 307c, an entropy coding program 307d, and various programs 307e. The CPU 301 reads the detection program 307a, the special position determination program 307b, the redisplay program 307c, the entropy coding program 307d, and the various programs 307e, and loads them into the RAM 306.

The detection program 307a functions as a detection process 306a. The special position determination program 307b functions as a special position determination process 306b. The redisplay program 307c functions as a redisplay process 306c. The entropy coding program 307d functions as an entropy coding process 306d. The various programs 307a function as various processes 306a.

Processing in the detection process 306a corresponds to a process performed by the detection section 120. Processing in the special position determination process 306b corresponds to processes performed by the special position determination sections 130 and 210. Processing in the redisplay process 306c corresponds to a process performed by the redisplay section 140. Processing in the entropy coding process 306d corresponds to a process performed by the entropy coding section 160. Processing in the various processes 306e corresponds to processes performed by the motion search section 151, the motion-compensated image generation section 152, the difference image generation section 153, the orthogonal transformation section 154, the quantization section 155, the inverse quantization section 156, the inverse orthogonal transformation section 157, and the decoded-image generation section 158.

The programs 307a to 307e may not necessarily be stored on the hard disk drive 307 from the beginning. An alternative is to store the programs 307a to 307e on a portable physical medium, such as a flexible disk (FD), a compact disc (CD)-ROM, a digital versatile disc (DVD) disk, a magneto-optical disk, or an integrated circuit (IC) card, insert the portable physical medium into the computer 300, and allow the computer 300 to read and execute the programs 307a to 307e.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video coding device comprising:
a memory; and
a processor coupled to the memory and the processor configured to,
sequentially receive a plurality of pictures and detect a scene change based on the plurality of pictures,
when the scene change is detected, determine whether or not a given condition is satisfied by a position of a first picture where the scene change is detected, and
when the given condition is satisfied by the position of the first picture, redisplay a forward second picture among a plurality of pictures referenced by the first picture.

2. The video coding device according to claim 1,
wherein, when the given condition is satisfied by the position of the first picture, the processor generates a coded picture by setting a forward picture as a reference picture, setting a motion vector to a zero vector, and setting a transformation coefficient to zero.

3. The video coding device according to claim 1,
wherein, when a distance between the position of the first picture and a position of the second picture is shorter than a first threshold value and a distance between the position of the first picture and a position of a backward third picture referenced by the first picture is not shorter than a second threshold value, the processor determines that the given condition is satisfied by the position of the first picture.

4. The video coding device according to claim 1,
wherein, when the number of pictures partitioned by a structure of picture is 16, the processor determines whether or not the first picture is either at a first position or at a ninth position, and
when the first picture is either at the first position or at the ninth position, the processor redisplays the forward second picture among the plurality of pictures referenced by the first picture.

5. A video coding method that is executed by a computer, the method comprising:
sequentially receiving a plurality of pictures;
detecting a scene change based on the plurality of pictures;
when the scene change is detected, determining whether or not a given condition is satisfied by a position of a first picture where the scene change is detected; and
when the given condition is satisfied by the position of the first picture, redisplaying, instead of the first picture, a forward second picture among a plurality of pictures referenced by the first picture.

6. The video coding method according to claim 5,
wherein, when the given condition is satisfied by the position of the first picture, the redisplaying generates a coded picture by setting a forward picture as a reference picture, setting a motion vector to a zero vector, and setting a transformation coefficient to zero.

7. The video coding method according to claim 5,
wherein, when a distance between the position of the first picture and a position of the second picture is shorter than a first threshold value and a distance between the position of the first picture and a position of a backward third picture referenced by the first picture is not shorter than a second threshold value, the determining determines that the given condition is satisfied by the position of the first picture.

8. The video coding method according to claim 5,
wherein, when the number of pictures partitioned by a structure of picture is 16, the determining determines whether or not the first picture is either at a first position or at a ninth position, and
when the first picture is either at the first position or at the ninth position, the determining redisplays the forward second picture among the plurality of pictures referenced by the first picture.

9. A non-transitory computer-readable recording medium storing therein a program for causing a computer to execute a process, the process comprising:
sequentially receiving a plurality of pictures;
detecting a scene change based on the plurality of pictures;
when the scene change is detected, determining whether or not a given condition is satisfied by a position of a first picture where the scene change is detected; and
when the given condition is satisfied by the position of the first picture, redisplaying, instead of the first picture, a forward second picture among a plurality of pictures referenced by the first picture.

10. The non-transitory computer-readable recording medium according to claim 9,
wherein, when the given condition is satisfied by the position of the first picture, the process of redisplaying generates a coded picture by setting a forward picture as a reference picture, setting a motion vector to a zero vector, and setting a transformation coefficient to zero.

11. The non-transitory computer-readable recording medium according to claim 9,
wherein, when a distance between the position of the first picture and a position of the second picture is shorter than a first threshold value and a distance between the position of the first picture and a position of a backward third picture referenced by the first picture is not shorter than a second threshold value, the process of determining determines that the given condition is satisfied by the position of the first picture.

12. The non-transitory computer-readable recording medium according to claim 9,
wherein, when the number of pictures partitioned by a structure of picture is 16, the process of determining determines whether or not the first picture is either at a first position or at a ninth position, and
when the first picture is either at the first position or at the ninth position, the process of determining redisplays the forward second picture among the plurality of pictures referenced by the first picture.

* * * * *